3,030,254
METHOD OF SPLICING
Robert Eyer Albert, Newark, Del., assignor to E. I. du Pont de Nemours and Company, Wilmington, Del., a corporation of Delaware
No Drawing. Filed Apr. 18, 1958, Ser. No. 729,224
5 Claims. (Cl. 156—331)

This invention relates to a method of splicing films, in particular photographic films, by employing a high melting piperazine polyurethane in a dielectric heating splicing or resistance heating splicing process.

Film splicing has been a problem in the motion picture industry for many years. It is known to use as splicing cements for motion picture film adhesive compositions in suitable solvents, relying on solvent action and dissolved polymers to make a strong splice.

The splicing problem has become more acute with the introduction of polymeric polyester photographic film base, such as biaxially oriented ethylene glycol/terephthalic acid polyester. Such polyesters, because of their chemical inertness, are not attacked by common solvents suitable for making cement and as a result cannot be spliced effectively by conventional solvent splicing cements. When a solvent does attack the polyester, generally the polyester film base becomes brittle and the splice breaks easily.

A strong splice is essential for satisfactory motion picture film. While in use in a projector, motion picture film is under stress due to the heating and cooling conditions and projector tensions. What has been needed is a splicing process utilizing an adhesive composition having strong adhesive qualities not dependent on its solvent properties to make strong splices.

An object of the present invention therefore is to provide a film splicing method particularly useful in the splicing of motion picture film. Another object is to provide such a process employing a composition strongly adherent to films of polyesters, such as polyethylene terephthalate, and additionally to other film materials, such as cellulose acetate, cellulose triacetate, cellulose nitrate, polystyrene, etc. Yet another object is to provide such a process useful in laminating flexible web materials and adhering plastics to other plastics or to metals.

An important object of my film splicing process is to employ a film splicing adhesive which is non-toxic and which is in convenient form for the splicing of cine film. A specific object is to provide such a process using an adhesive composition adherent to polyester photographic film base. Still other objects will be apparent from the following description of the invention.

The high melting piperazine polyurethanes employed in the process of my invention are high molecular weight fiber-forming polyurethanes obtained by condensing piperazine and a bis-chloroformate derived from a dihydric alcohol selected from the group consisting of ethylene glycol, pentaglycol, 1,4-cyclohexanediol and bis-2,2(4-hydroxycyclohexyl)propane. These piperazine polyurethanes have melting points in excess of 200° C. and can be cold-drawn into highly oriented shaped articles. They are composed of recurring structural units of the general formula

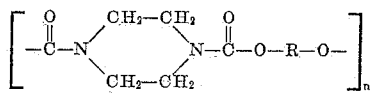

where $n$ is a large whole number, the —O—R—O— group is the residue of the dihydric alcohol used, and the remainder of the unit can be regarded as the residue of 1,4-piperazinedicarboxylic acid. Accordingly, these polymers can be designated as polyesters of 1,4-piperazinedicarboxylic acid.

These piperazine polyurethanes employed in the process of my invention are known polymers. These polymers and their preparation are fully disclosed in Wittbecker U.S. Patent No. 2,731,446, which also describes shaped structures including filaments, yarns and films composed of such polymers.

According to this invention, the preferred polyurethane is the reaction product of piperazine and ethylene-bis-chloroformate, prepared as taught in Example 1 of the aforementioned Patent No. 2,731,446.

The process of this invention can be carried out by placing the polyurethane polymer described above in the film splicing area in contact with the surfaces of two adjacent film ends to be spliced, and applying heat to the splicing area to form the splice.

The inventive contribution of this process lies in the discovery that the above-described polyurethanes enable the making of strong uniform film splices, without toxic effect on the person performing the splice and without deleterious effect on the properties of the films, such as light sensitive photographic films, being spliced. The polyurethane adhesive polymer has been found to be outstandingly effective in splicing polyester, e.g., polyethylene terephthalate, films, and as such has filled a serious need in the motion picture and related film industry.

The conditions of the process of this invention are not particularly critical, and this fact indeed is one of the important advantages of the process.

In general, the polymer can be utilized in the form of (a) a monofilament, or (b) a multifilament, or (c) coated on a supporting fiber which can be synthetic or natural, or (d) coated on a supporting tape or film, as will be understood in the art and explained in further detail hereinafter.

The duration of heat application can also vary, and will depend on the splicing equipment being utilized, the type of heating method employed (such as dielectric heating or resistance heating), etc. Generally, completely satisfactory splices can be obtained by heating for a period of from about 1 to about 15 seconds, and this range is therefore preferred. A duration of 1 to 6 seconds is most preferred.

The splicing temperature and pressure likewise can be readily determined by persons skilled in the art, and ranges of temperature and pressure known and used heretofore in the industry and on conventional and known splicing equipment are satisfactory in my process. Generally, temperatures within the range from about 150° C. to about 230° C. are used in the art for prior splicing methods. The pressure, particularly required for splicing overlapping film ends, should be sufficient to distribute the adhesive polymer and a broad range of pressures is suitable. A pressure of about 100 pounds per square inch, produced on known splicing equipment, is entirely satisfactory for forming a strong splice.

As stated above, known splicing equipment can be used in carrying out the process of my invention. For example, for dielectric heat splicing, a suitable and practical method and apparatus are described by R. W. Upson, Emery Meschter and W. R. Holm in an article entitled "A Method Using Dielectric Heating for Splicing Motion-Picture Film," in the Journal of the Society of Motion Picture and Television Engineers, vol. 66, No. 1, pages 14-16, January 1957. The desicribed apparatus is a modification of a Bell & Howell professional motion picture film splicer which is the subject of Howell U.S. Patent No. 1,275,431. Other splicing apparatus, such as that described in Griswold U.S. Patent No. 1,596,966, have been successfully adapted for dielectric splicing by modification as taught in the Upson, Meschter and Holm article. One commercially available splicing machine using dielectric heating is the "Neumade" Shepard electronic splicer, available from the Neumade Products Corp., New York City, New York.

Resistance heating type splicing apparatus are also known in the art. One such splicer is described in Herzig et al. U.S. Patent No. 2,468,629. Another resistance heating splicer, a modification of that described in the Griswold patent referred to above, is disclosed and claimed in assignee's Upson and Lusebrink U.S. patent application Serial No. 609,379, filed September 12, 1956, now abandoned.

As stated above, the polyurethane adhesive polymer necessary for my splicing or laminating process can be employed in the form of (a) a monofilament, (b) a multifilament, (c) coated on a fiber, or (d) coated on a tape or film. The latter form is utilized in making butt splices and employs resistance heating methods. The preferred form is (c), the fiber coated with the polyurethane.

When the polymer is utilized in the form of (a) a monofilament, the thread preferably has a diameter of from about 0.003 to about 0.007 inch. When in the form of (b) a multifilament, the thread preferably has a cross-sectional area equivalent to a monofilament of a diameter of from about 0.003 to about 0.007 inch. When the polymer is in the form of (a) or (b), a splice is conveniently prepared by placing the thread of polymer in the splicing area between two overlapping film ends to be joined. When preparing an overlap splice of emulsion bearing photographic films, the emulsion layer should first be scraped from the film that is the lower of the pair of films being spliced. Preferably a dielectric splicing instrument of the type mentioned above is employed. The overlap for the "Neumade" Shepard electronic splicer is 0.030 inch, while the overlap for the modified Griswold splicer is 0.062 inch. Heat is applied for a preferred period of 1 to 6 seconds while the splicing area is under normal machine pressure. Splices so prepared have exhibited excellent creep resistance, tensile strength and peel strength, and have demonstrated excellent properties under projection tests and high moisture conditions. They have also shown outstanding resistance to photographic processing solutions.

The preferred form of the polymer for use in my process is (c) coated on a fiber. The fiber is preferably 70 denier polyethylene terephthalate because of its strength and other desirable properties, although the fiber can be prepared from, for example, viscose rayon, cotton, polyvinylidene chloride, polyamides, polyacrylics, polycarbonates, etc., coated with the polyurethane to a total denier of about 150 to 200 by any suitable procedure, one of which is described in the examples below. The splice is prepared under conditions described above for forms (a) and (b), preferably in the aforementioned dielectric splicers.

When the polymer is utilized in the form of (d), i.e., coated on a tape or film, the splice can be conveniently prepared in the Herzig et al. resistance heating apparatus referred to above. The tape is preferably of polyethylene terephthalate about 0.001 to 0.004 inch thick coated on one surface with the polyurethane in a dry coating thickness of from about 0.0002 to 0.001 inch. The two film ends to be joined are placed end to end in the splicing area of the splicing instrument, and the coated tape placed either on top of or underneath the abutting ends, preferably the latter. The films need not be scraped and can be placed emulsion side up or down. The polymer coating on the tape can be placed next to the emulsion side or the base side of the films being spliced. It is preferred that the coated tape be positioned in the splicing instrument next to the heating unit of the instrument. Heating at regular machine pressure for at least 2 seconds at an ammeter reading of 7 provides an excellent splice.

Although the preferred tape support is polyethylene terephthalate, other materials that can be advantageously utilized include polycarbonates, polyamides, cellulose esters, vinyl polymers and other polyesters such as polyethylene isophthalate and a polyester of terephthalic acid and 1,4-cyclohexanedimethanol. These base materials can be coated on either one or both sides. The splices can be made with the film ends to be joined in abutting or in overlapping relationship as will be understood in the art.

In preparing the coated tape, the polyurethane can be coated from a suitable emulsion or solvent solution, which can also contain alcohols, suitable plasticizers and other additives if desired. Suitable solvents include formic acid, chloroform, methylene chloride, and solvent mixtures, e.g., chloroform/formic acid, methylene chloride/formic acid, methyl alcohol/formic acid, methyl alcohol/methylene chloride, and methyl alcohol/chloroform. Alcohols that can be added include, e.g., methyl, ethyl, propyl and butyl. Plasticizers that can be added include, e.g., dichloropropanol, dibromopropanol, and ethylene dicyanide.

In addition to the polymer forms mentioned above, the polyurethane can be used as a highly viscous thermoplastic mass. A variation of the mono or multifilament form is a ribbon consisting of the polyurethane adhesive.

An outstanding advantage of the process of this invention is that splices or laminates can be made between films or sheets of various materials. Of particular importance is my discovery that the above described polyurethanes can be effectively used to join, for example, polyethylene terephthalate to polyethylene terephthalate, polyethylene terephthalate to cellulose triacetate, and cellulose triacetate to cellulose triacetate. The polyurethane compositions are also strongly adherent to such varied film materials as cellulose acetate, cellulose nitrate, polystyrene and a polyester of terephthalic acid and 1,4-cyclohexanedimethanol. Other materials that can be bonded by the use of the polyurethane composition include plastic sheets, wood, paper, metals, e.g., aluminum, titanium, and iron, metal alloys, e.g., brass and nichrome.

The invention will be further explained but is not intended to be limited by the following examples:

*Example 1*

The polyurethane used in this example was prepared from piperazine and ethylene bis-chloroformate as described in Example 1 of Wittbecker U.S. Patent No. 2,731,446, and formed into a 20 filament thread having a total cross-sectional area equivalent to a monofilament 0.006 inch in diameter as described in Example 8 of the Wittbecker patent. Separate portions of the thread were used to make three splices according to this invention, to join together photographic films having bases of, respectively, (1) polyethylene terephthalate and polyethylene terephthalate, (2) polyethylene terephthalate and cellulose triacetate, and (3) cellulose triacetate and cellulose triacetate.

The splices were made by forming sandwiches having a 0.030 inch overlap with the emulsion scraped from one of the films as will be understood. The sandwiches were heated for about 2 seconds each in a Shephard electronic splicer described above. The rated electrical input was 117 volts, 60 cycles and the standby power consumption 50 watts. After cooling, the spliced films were ready for use.

Peel strength tests were preformed to determine the load value that would cause spliced film to break at the splice. Splices were prepared so that the film strips overlapped along their whole length but the polyurethane adhesive was applied only at one end over an area 1.375 inches by 0.030 inch. The test values were determined, after conditioning the splices for two weeks under the conditions indicated below, using the Instron tensile testing machine manufactured by the Instron Engineering Corporation of Quincy, Massachusetts, according to test procedures reported in Trans. ASME 71, 789–96 (October 1949). As the weight load increased, the overlapped films peeled apart. Peel strength measurements for the splice made by joining (1) the polyethylene terephthalate to polyethylene terephthalate showed the peel strength was 13 pounds at 22° C. and 50% relative humidity, 8 pounds at 35° C. and 90% relative humidity, 4 pounds at 45° C. and 90% relative humidity, 5 pounds at 50° C. and 90% relative humidity, 5 pounds at 50° C. and 18% relative humidity, 7 pounds at 0° C. and 100% relative humidity and 7 pounds at 0° C. dry. Peel strength measurements for the (2) polyethylene terephthalate to cellulose triacetate bond were, at the same test conditions, respectively, 7, 2, 2, 4, 4, 7 and 6 pounds. Peel strength measurements for the (3) cellulose triacetate to cellulose triacetate bond were, at the same test conditions, respectively, 6, 5, 5, 6, 9, 3 and 4 pounds.

Tensile strength tests also were performed on the Instron machine to determine the force in pounds necessary to break the splices under a tensile load along the length of the film. Tensile strength measured for splices made by joining (1) polyethylene terephthalate to polyethylene terephthalate was 62 pounds at 22° C. and 50% relative humidity, 43 pounds at 35° C. and 90% relative humidity, 39 pounds at 45° C. and 90% relative humidity, 31 pounds at 50° C. and 90% relative humidity, 59 pounds at 50° C. and 18% relative humidity and 67 pounds at 0° C. and 100% relative humidity. Tensile strength measurements for the (2) polyethylene terephthalate to cellulose triacetate bond were, at the same test conditions, respectively, 64, 52, 37, 44, 58 and 63 pounds. Tensile strength measurements for the (3) cellulose triacetate to cellulose triacetate bond were, at the same test conditions, respectively, 76, 71, 64, 62, 68 and 71 pounds.

Creep resistance tests were also performed. This test determined the distance in thousandths of an inch the spliced films separate under the exertion of a cycling 5 to 5.5 pounds tensile load on the splice for a 10 minute period at various temperatures and relative humidity. Creep resistance measurements made on splices of (1) polyethylene terephthalate to polyethylene terephthalate were less than 0.001 inch at 22° C. and 50% relative humidity, 0 at 35° C. and 90% relative humidity, less than 0.001 inch at 45° C. and 90% relative humidity, 0.001 inch at 50° C. and 90% relative humidity, less than 0.001 inch at 50° C. and 18% relative humidity, 0 at 0° C. and 100% relative humidity and 0 at 0° C. dry. Creep resistance measurements for the (2) polyethylene terephthalate to cellulose triacetate bond were, at the same test conditions, respectively, less than 0.001, less than 0.001, 0.001 to 0.002, less than 0.001, less than 0.001, less than 0.001 and less than 0.001 inch. Creep resistance measurements for the (3) cellulose triacetate to cellulose triacetate bond were, at the same test conditions, respectively, less than 0.001, 0.001, 0.001 to 0.002, 0.001, less than 0.001, 0.001 and 0 inch.

All of these tests demonstrated that a satisfactory splice was obtained in each instance.

*Example 2*

Example 1 was repeated except that the splicing instrument was a Griswold machine of the type disclosed in Griswold U.S. Patent No. 1,596,966, converted to a heat splicing apparatus by attaching to the upper part of the instrument an electronic power oscillator unit equivalent in frequency, operating voltages and power output to that described in the Upson, Meschter and Holm article mentioned above. An inductor assembly extends vertically in an insulated bushing from the center inductor assembly of the power oscillator through the oscillator support and terminates in an articulated electrode movable in one plane only. This electrode, which contacts the film to be spliced, forms one plate of the capacitance element in the oscillator load circuit. The film itself forms the dielectric of the capacitance element, and the cutter bar of the splicer is the "ground" plate.

Tensile strength and creep resistance tests were performed as in Example 1 with the following results:

Tensile strength measured for splices made by joining (1) polyethylene terephthalate to polyethylene terephthalate was 59 pounds at 22° C. and 50% relative humidity, 45 pounds at 35° C. and 90% relative humidity, 39 pounds at 45° C. and 90% relative humidity, 45 pounds at 50° C. and 90% relative humidity, 56 pounds at 50° C. and 18% relative humidity, 75 pounds at 0° C. and 100% relative humidity and 80 pounds at 0° C. dry. Tensile strength measurements for the (2) polyethylene terephthalate to cellulose triacetate bond were, at the same conditions, respectively 65, 54, 25, 26, 58, 65 and 58 pounds. Tensile strength measurements for the (3) cellulose triacetate to cellulose triacetate bond were, at the same conditions, respectively, 50, 61, 46, 40, 57, 50 and 72 pounds.

Creep resistance measurements made on splices of (1) polyethylene terephthalate to polyethylene terephthalate were less than 0.001 inch at 22° C. and 50% relative humidity, less than 0.001 inch at 35° C. and 90% relative humidity, 0 at 45° C. and 90% relative humidity, 0.001 inch at 50° C. and 18% relative humidity, 0 at 0° C. and 100% relative humidity and less than 0.001 inch at 0° C. dry. Creep resistance measurements for the (2) polyethylene terephthalate to cellulose triacetate bond were, at the same test conditions, respectively, less than 0.001, less than 0.001, less than 0.001, 0.001 and 0.002 inch. Creep resistance measurements for the (3) cellulose triacetate to cellulose triacetate bond were, at the same test conditions, respectively, less than 0.001, less than 0.002, less than 0.002, less than 0.001, 0.001 and 0.003 inch.

These tests likewise demonstrated that a satisfactory splice was obtained in each instance.

*Example 3*

A composite roll containing 10 splices eac hof 18 types of splices 10 feet from the succeeding splice was prepared. Splices numbers 10, 11 and 12 were respectively cellulose triacetate-cellulose triacetate, cellulose triacetate-polyethylene terephthalate and polyethylene terephthalate-polyethylene terephthalate prepared as described in Example 2 with 0.062 inch overlap. Splices numbers 16, 17 and 18 consisted of the same combinations of photographic films but were prepared as described in Example 1 with a 0.030 inch overlap. Each splice type was repeated ten times at 18 splice (180 feet) intervals. The composite roll was tested by running it through a projector at approximately 24° C. and 50 percent relative humidity under high intensity arc conditions (arc current 127 amperes) which resulted in a radiant energy level at the projector gate of 0.35 watts per mm.². No splice failures were noted after 392 projections.

*Example 4*

Four separate mixed splices, (i.e., one scraped polyethylene terephthalate photographic film was bound to one cellulose triacetate photographic film) were prepared using the polyurethane adhesive and splicing machine described in Example 1 with a 0.030 inch overlap. The splices were made into a loop 8 feet long (splices were 2 feet apart). The loop was run through a color developer comprised of:

|  | Gms. |
|---|---|
| N,N-diethyl-p-phenylenediamine hydrochloride | 2.5 |
| Sodium sulfite, anhydrous | 10 |
| Sodium carbonate, monohydrate | 47 |
| Potassium bromide | 2 |
| All diluted up to one liter with water | | at the rate of 96 feet per minute continuously for two weeks. The temperature was maintained at approximately 24° C. No splice failures were noted.

*Example 5*

A composite splice roll was prepared using the thread and splicing machine described in Example 1 with a 0.030 inch overlap. The roll contained 10 polyethylene terephthalate-polyethylene terephthalate, 21 polyethylene terephthalate-cellulose triacetate splices, and 10 cellulose triacetate-cellulose triacetate splices. The splices were each 10 feet from the next succeeding splice, the first splice beginning 110 feet from the start of the roll. The roll thus prepared was processed in the following developer for about 2.5 minutes at 20° C.:

| | Gms. |
|---|---|
| N-methyl-p-aminophenol sulfate | 0.5 |
| Sodium sulfite, anhydrous | 40 |
| Hydroquinone | 5 |
| Sodium carbonate, monohydrate | 12 |
| Potassium bromide | 1 |
| Water to make 1 liter | | at a processing speed of 95 feet per minute. The film was rinsed in running water for 2 minutes at 10.3 to 10.6° C., fixed in potassium alum hardener fixing bath for 6 minutes at 20° C., washed once more in water at 20° C. for 6 minutes, and finally dried in a circulating air dryer for about 30 minutes at a maximum air temperature of about 40.3° C. No splice failures were noted. The roll as taken from the processing machine was tested in the high intensity projector in Example 3. After 80 projections on splice failures resulted.

*Example 6*

A polyurethane was prepared as described in Example 1 of U.S. 2,731,446 and melt extruded to form a monofilament thread approximately 7 mils in diameter. The polyurethane monofilament thread thus prepared was used to splice polyethylene terephthalate photographic film to cellulose triacetate photographic film. The Shepard splicing machine with a 0.030 inch overlap described in Example 1 was used and the procedure described in Example 1 was repeated. A roll was prepared with the splices positioned 810 feet from the beginning of the roll and set 10 feet apart. A total of 10 mixed splices were prepared. The roll was aged for 10 days at 45° C. and 90% relative humidity and projected in the machine described in Example 3. The film was projected 77 times with no splice failures.

*Example 7*

A composite roll containing the splice combinations listed below was prepared using the multifilament form of the polyurethane described in Example 1, the splices being prepared in the instruments described in Examples 1 (0.030″ overlap) and Example 2 (0.062″ overlap). The roll was aged as described in Example 6. The roll contained: (*a*) a cellulose triacetate-cellulose triacetate splice (0.062 inch overlap) followed in 20 feet by (*b*) a cellulose triacetate polyethylene terephthalate splice (0.062 inch overlap) followed 20 feet later by (*c*) polyethylene terephthalate-cellulose triacetate (0.030 inch overlap) and lastly after another 20 feet separation (*d*) cellulose triacetate-cellulose triacetate (0.30 inch overlap). This configuration was repeated 8 times. The roll was projected 77 times under the conditions described in Example 3. Excellent results were obtained.

*Example 8*

Two unscraped polyethylene terephthalate photographic films were placed end to end with the emulsion side up in a resistance heating splicing instrument such as is described in Herzig et al. U.S. 2,468,629. A strip of polyethylene terephthalate film, 0.0015 inch thick, was skim coated on one surface with the polyurethane prepared as described in Example 1 dissolved in a methylene chloride (35 parts by weight)/formic acid (1 part by weight) solvent solution (5 percent solids). The coated film strip was dried at 65° C. and the dry coating thickness of the polyurethane was 0.0003 inch. The polyurethane coated polyethylene terephthalate tape 0.125 inch wide was placed, coated surface down, on the emulsion surface of the abutting photographic films. A satisfactory splice was obtained by heating the splice for 2 seconds at an ammeter reading of 7.

*Example 9*

Example 8 was repeated seven times except that:
(*a*) The polyurethane coated polyethylene terephthalate film was placed coated surface down on two unscraped polyethylene terephthalate photographic films with their base sides up.
(*b*) The polyurethane coated polyethylene terephthalate film was placed coated side up below the polyethylene terephthalate photographic films with their emulsion side down.
(*c*) Procedure (*b*) was repeated except that the polyethylene terephthalate photographic films had their base side down.
Satisfactory splices were obtained in each instance.
Example 8 and the above three variations were repeated using a mixed splice of polyethylene terephthalate and cellulose triacetate photographic films. Satisfactory splices were obtained by heating each splice for 2 seconds at an ammeter reading of 8.

*Example 10*

70 denier polyethylene terephthalate fibers were coated with the polyurethane adhesive prepared as described in Example 1 dissolved in a methylene chloride (80 parts by weight)/formic acid (20 parts by weight) solvent solution (15% solids) by guiding the fibers beneath the surface of the polyurethane in the solvent solution and doctoring the amount of the coating by passing the coated fibers vertically through a metal plate pierced with holes .041, .043 and .052 inch in diameter. The coated fibers were dried by passing them vertically through a steam heated (100° C.) drying chamber at a speed of approximately 110 feet per minute. The coated fibers were used to splice polyethylene terephthalate photographic film to cellulose triacetate photographic film as described in Example 2 (0.062 inch overlap). The following results were obtained:

| Wet Coating Diameter (Inches) | Tensile Strength (lbs.) | Peel Strength (lbs.) |
|---|---|---|
| .041 | 47.4 | 7.5 |
| .043 | 49.8 | 9.1 |
| .052 | 47.7 | 13.0 |

The above procedure was repeated coating 100 denier polyamide (nylon) and 140 denier polyethylene terephthalate to a wet coating thickness as indicated below with the following results being obtained:

| Fiber (deniers) | Wet Coating Diameter (inches) | At Room Temperature | |
|---|---|---|---|
| | | Tensile Strength (lbs.) | Peel Strength (lbs.) |
| Polyamide (100) | .041 | 31.9 | 4.5 |
| Do | .043 | 31.9 | 5.6 |
| Do | .052 | 36.5 | 5.9 |
| Polyethylene terephthalate (140) | .041 | 44.7 | 7.8 |
| Do | .043 | 42.9 | 11.2 |
| Do | .052 | 29.1 | 7.5 |

*Example 11*

70 denier polyethylene terephthalate fiber was coated to a dry weight of 150 denier with the polyurethane adhesive prepared as described in Example 1 by the procedure described in Example 10. The solvent solution was similar to that described in Example 10. The coated 150 denier polyethylene terephthalate fiber was used to splice polyethylene terephthalate to cellulose triacetate photographic films as described in Example 2 (0.062 inch overlap). The following results were obtained:

Tensile strength at room temperature (lbs.) ----- 50.12
Peel strength at room temperature (lbs.) -------- 10.08
Peel strength at 50° C. (lbs.) ------------------ 12.14
Creep resistance 50° C. less than 0.001 inch.

The invention claimed is:

1. The method of lap splicing a photographic film base selected from the group consisting of polyester, cellulose acetate, cellulose triacetate, cellulose nitrate and polystyrene films to a film selected from the group aforesaid, comprising forming a sandwich structure of a polymeric material between the surfaces of the films to be spliced, and heating said sandwich structure for a period of from about 1 to 15 seconds within a temperature range from about 150° C. to about 230° C. under sufficient pressure to distribute said polymeric material, said polymeric material being a high melting, high molecular weight polyurethane of 1,4-piperazine dicarboxylic acid and a dihydric alcohol selected from the group consisting of ethylene glycol, pentaglycol, 1,4-cyclohexanediol and bis-2,2(4-hydroxycyclohexyl)propane.

2. The process of splicing a photographic film base taken from the group consisting of polyester, cellulose acetate, cellulose triacetate, cellulose nitrate and polystyrene which comprises placing a polymeric material in contact with each of two film surfaces to be spliced, heating said polymeric material for about 1 to 15 seconds within a temperature range from about 150° C. to about 230° C. to form a firm bond between said two surfaces, said polymeric material being a high melting, high molecular weight piperazine polyurethane obtained by condensing piperazine and a bis-chloroformate derived from a dihydric alcohol selected from the group consisting of ethylene glycol, pentaglycol, 1,4,-cyclohexanediol and bis-2,2(4-hydroxycyclohexyl)propane.

3. The process as set forth in claim 2 wherein said polymeric material is polyethylene 1,4-piperazine-dicarboxylate.

4. The process of splicing photographic film base which comprises placing a polymeric material in contact with the surface of each of two films to be spliced, one of said films being a polyethylene terephthalate film and the other said film being taken from the group consisting of polyethylene terephthalate, cellulose acetate, cellulose triacetate, cellulose nitrate and polystyrene, heating said polymeric material for about 1 to 15 seconds within a temperature range from about 150° C. to about 230° C. to form a firm bond between said two film surfaces, said polymeric material being a high melting, high molecular weight piperazine polyurethane obtained by condensing piperazine and a bis-chloroformate derived from a dihydric alcohol selected from the group consisting of ethylene glycol, pentaglycol, 1,4-cyclohexanediol and bis-2,2(4-hydroxycyclohexyl)propane.

5. The process of splicing photographic film base which comprises placing a polymeric material in contact with the surface of each of two polyethylene terephthalate films to be spliced, heating said polymeric material for about 1 to 15 seconds within a temperature range from about 150° C. to about 230° C. to form a firm bond between the polyethylene terephthalate film surfaces, said polymeric material being a high melting, high molecular weight piperazine polyurethane obtained by condensing piperazine and a bis-chloroformate derived from a dihydric alcohol selected from the group consisting of ethylene glycol, pentaglycol, 1,4-cyclohexanediol and bis-2,2(4-hydroxycyclohexyl)propane.

References Cited in the file of this patent

UNITED STATES PATENTS

| | | |
|---|---|---|
| 2,495,761 | Platt | Jan. 31, 1950 |
| 2,503,251 | Edwards | Apr. 11, 1950 |
| 2,723,935 | Rodman | Nov. 15, 1955 |
| 2,731,446 | Wittbecker | Jan. 17, 1956 |
| 2,765,251 | Williams | Oct. 2, 1956 |
| 2,849,359 | Smith | Aug. 26, 1958 |